United States Patent Office 3,411,855
Patented Nov. 19, 1968

3,411,855
CANDLES
Sven Olund, San Rafael, Calif., assignor to Chevron Research Company, San Francisco, Calif., a corporation of Delaware
No Drawing. Filed Dec. 7, 1966, Ser. No. 599,719
6 Claims. (Cl. 431—4)

ABSTRACT OF THE DISCLOSURE

Encased candles in which the fuel is a mixture of paraffin wax which melts at about 105–175° F. and polybutene of about 500 to 20,000 SUS at 200° F. viscosity made using Friedel-Crafts catalyst.

INVENTION BACKGROUND

This invention is directed to encased paraffin wax candles having improved smoking properties and methods for reducing the smoking of encased paraffin wax candles.

Paraffin wax candles which burn in a casing have two shortcomings. Firstly, these candles smoke excessively as the wick burns down in them. This smoking is objectionable since the smoke may build up in confined air spaces or produce unsightly black soot deposits on the sides of the casing and nearby surfaces. Secondly, the wax tends to build up on the sides of the casing.

INVENTION DESCRIPTION

It has now been found that the smoke production of encased paraffin wax candles may be reduced significantly by blending small amounts of polybutene with the wax. It was also discovered that the polybutene reduced the build up of wax on the sides of the candles casing.

The candles of this invention comprise a casing at least partially filled with a blend of wax and polybutene and a combustible wick positioned in the blend. A major proportion of the blend is paraffin wax having a melting point in the range of about 105 to 175° F., preferably 120 to 165° F. The polybutene is about 5 to 15% by weight of the blend. Other materials may be incorporated in the blend to impart desirable properties to the candle. For instance, minor amounts of stearic acid, other waxes such as microcrystalline waxes and natural waves, β-napthol, coloring agents and the like may be added to the paraffin wax-polybutene blend.

The polybutene of this invention has a viscosity in the range of about 500 to 20,000 SUS at 210° F., preferably 2,000 to 4,000 SUS at 210° F. These polybutenes may be made by well known methods which involve polymerizing butene in the presence of a Friedel-Crafts catalyst. Temperatures used in the polymerization will normally be in the range of about 20 to 100° F. The polymerization normally takes place in the presence of inert hydrocarbon solvents such as propane, butane, isopentane and heptane. Halogenated hydrocarbon solvents may be used if desired. Friedel-Crafts catalysts comprise a principal catalyst which is usually the halide of a group II to IV metal such as aluminum chloride, aluminum bromide, titanium tetrachloride, boron trichloride and stannic chloride or a halide of a higher group metal such as ferric chloride and a co-catalyst such as an alkyl halide, hydrochloric acid, water or other substance which gives rise to protons or carbonium ions. The weight ratio of principal catalyst to co-catalyst may vary widely. Usually it is in the range of about 1:1 and 10:1.

The unique candles of this invention may be formed by techniques which are generally known in the art. The wax and polybutene may be blended by adding the polybutene to molten wax and stirring the mixture. The encased candles may be made by filling a non-combustible casing having a combustible wick positioned therein with the molten wax-polybutene blend so as to surround the wick and allowing the blend to solidify. The selection of the wick for the candles of this invention is believed to be within the scope of those skilled in the art. Materials such as glass, ceramic, metals and the like may be used for the casing.

The wax-polybutene mixtures described above are not suitable for making candles which are not encased.

Example

This invention is illustrated by the following example. This example is offered to illustrate the invention and is not meant to limit it in any way.

Molten blends of paraffin wax (M.P. 128–130° F.) and various polyisobutenes were made by mixing the wax and polyisobutene in the desired proportions in a heated container. These blends were poured into 9 by 2.25 in. I.D. cylindrical glass containers having fabric wicks positioned therein so as to surround the wick. The blends were allowed to solidify and the wicks were then lit. After a given burning time, the candles were extinguished and the containers were examined visually for soot deposits or wax build up on the sides of the container. The viscosity of the polybutene used in test numbers 1, 2 and 3 was 3,000 SUS; that of test No. 4 was 1,000 SUS; and that of test No. 5 was 2,000 SUS, all measured at 210° F. The results of these tests are reported in the following table:

| Test No.: | Polybutene wt. percent | Burning time (hrs.) | Wax deposit | Soot deposit |
|---|---|---|---|---|
| 1 | 0 | 17 | Heavy | |
|   | 5 | 17 | Light | |
|   | 10 | 17 | None | |
| 2 | 0 | 40 | Heavy | |
|   | 10 | 40 | None | |
| 3 | 0 | 84 | | Heavy. |
|   | 2 | 77 | | Do. |
|   | 5 | 84 | | Medium. |
|   | 10 | 84 | | Very light. |
| 4 | 0 | ca. 15 | Heavy | |
|   | 10 | ca. 15 | Light | |
| 5 | 0 | ca. 15 | Heavy | |
|   | 10 | ca. 15 | None | |

As will be evident to those skilled in the art, various modifications on this invention can be made or followed, in the light of the foregoing disclosure and discussion, without departing from the spirit or scope of the disclosure or from the scope of the follwing claims.

I claim:
1. Candle comprising a casing at least partially filled with a composition comprising a major proportion of a paraffin wax having a melting point in the range of about 105–175° F. and about 5 to 15% by weight of polybutene having a viscosity in the range of about 500 to 25,000 SUS at 210° F., and a combustible wick positioned in said composition.

2. A candle according to claim 1 in which said melting point is in the range of 120° to 165° F.

3. A candle according to claim 1 in which said viscosity is in the range of 2,000 to 4,000 SUS at 210° F.

4. Method for reducing smoking of candles comprising a casing filled with a paraffin wax having a melting point in the range of about 105 to 175° F. and a combustible wick positioned in said wax which comprises blending polybutene having a viscosity in the range of about 500 to 20,000 SUS at 210° F. with said wax, said polybutene being about 5 to 15% by weight of the wax-polybutene blend.

5. Method of claim 4 wherein said melting point is in the range of 120–165° F.

6. Method of claim 4 wherein said viscosity is in the range of 2,000–4,000 SUS at 210° F.

References Cited

UNITED STATES PATENTS 2,831,330   4/1958   Walker _____ 431—288

CHARLES J. MYHRE, *Primary Examiner*.